C. R. ARCUS.
PRESSURE REGULATING OR REDUCING VALVE.
APPLICATION FILED DEC. 13, 1913.
1,132,424. Patented Mar. 16, 1915.
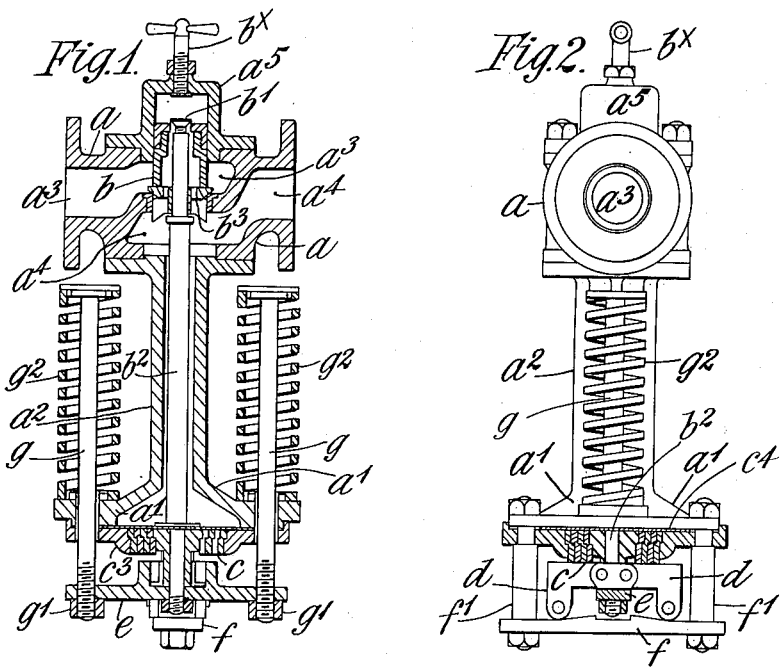
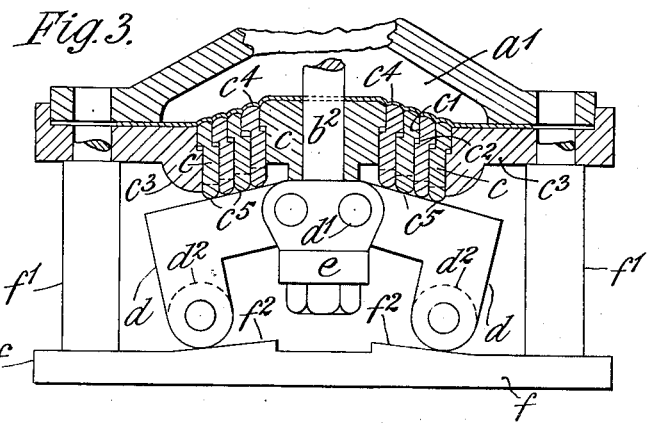

UNITED STATES PATENT OFFICE.

CHARLES ROBERT ARCUS, OF POPLAR, LONDON, ENGLAND, ASSIGNOR OF ONE-HALF TO OLIVER PRESCOTT MACFARLANE, OF LONDON, ENGLAND.

PRESSURE REGULATING OR REDUCING VALVE.

1,132,424.      Specification of Letters Patent.      Patented Mar. 16, 1915.

Application filed December 13, 1913. Serial No. 806,527.

*To all whom it may concern:*

Be it known that I, CHARLES ROBERT ARCUS, a subject of the King of Great Britain, residing at Bridge Road Works, Bridge Road, Poplar, in the county of London, England, have invented certain new and useful Improvements in or Relating to Pressure Regulating or Reducing Valves, of which the following is a specification.

This invention has reference to pressure regulating or reducing valves for steam or other fluids, and relates to valves of the kind which are held open by means of springs so long as the pressure on the outlet side is below that required, and are closed when the proper pressure is reached by the action of the steam or other fluid on a yielding diaphragm which opposes or balances the spring action. In certain of these arrangements the control valve is sometimes arranged in the upper part of the valve casing or body, the diaphragm being in the lower part thereof, and the two parts being connected by a narrow tubular portion or neck containing a column of water resting on the diaphragm. The valve spindle works inside this tubular neck, and is suitably connected to an india-rubber or other diaphragm. As the springs expand to open the valve, their force or pressure is reduced, and therefore the extent to which they oppose or balance the action of the diaphragm is liable to vary. Moreover the diaphragm itself is liable to rupture or damage by the action of the steam or other fluid.

Now a feature of the present invention consists in combining the diaphragm with a compensating arrangement which correspondingly reduces the effect of the said diaphragm as the force or counter-balancing action of the springs diminishes.

A further feature of the invention consists in constructing the diaphragm mainly of metal or solid parts, so that it is easily capable of resisting any destructive action such as referred to.

According to one example embodying the invention, the diaphragm is formed of a series of concentric or annular sections or rings working telescopically in each other. These rings rest upon compensating levers which are connected to the valve rod or spindle, and are so arranged that their effect (viz. the pull they exert on the said spindle) diminishes as the spindle rises under the action of the springs. This diminution corresponds to the reduced thrust of the springs as they expand. In addition to this, the diaphragm instead of being acted upon by the high-pressure fluid, is only acted on by the reduced pressure fluid.

The invention also comprises other features which will be more clearly understood by reference to the example shown in the accompanying drawings, in which:—

Figure 1 is a general vertical central section of the reducing valve. Fig. 2 is a side view in a direction at right angles to Fig. 1, but showing the lower part in central section. Fig. 3 is an enlarged sectional view of the said lower part, showing the manner in which the diaphragm acts. Fig. 4 is a detail view, half in section; of one of the rings of the diaphragm.

As shown, the body or casing of the improved valve comprises the upper and the lower portions at $a$, $a^1$, connected by the narrow tubular portion or neck $a^2$. The boiler-steam (or other fluid) enters at $a^3$ and after having had its pressure reduced, is drawn off as required, at the outlet passage $a^4$.

$b$ is the actual reducing or controlling valve, which consists of a hollow tubular body working pistonwise in a cylindrical portion $a^5$ of the casing. The spindle $b^2$ of the valve works centrally in the neck $a^2$, which also contains a column of water resting on the diaphragm. At its upper end the spindle $b^2$ carries a by-pass valve $b^1$ (for the purpose hereinafter mentioned) to which lead suitable small ports $b^3$ opening out of the low pressure passage $a^4$. Above the valve $b^1$ is provided an adjustable stop $b^x$ and by screwing down this latter, the valves can be fixed in their closed position.

The improved diaphragm consists of a series of concentric rings $c$ each having at the top an off-set rim or shoulder ($c^1$ Fig. 4) engaging in a corresponding recess ($c^2$, Figs. 3 and 4) in the adjacent ring. These rings work telescopically inside each other, the outermost ring working in a suitable fixed support or seating ring $c^3$. Above the rings is provided an ordinary rubber or fiber disk $c^4$ for the purpose of keeping the arrangement steam-tight, although of course this may be done by packing between the rings, or otherwise. The rings have downward projections or feet $c^5$ on opposite sides.

These feet rest on the horizontal parts of a pair of bell-crank levers $d$ pivoted at $d^1$ to a pair of lugs on a cross-bar or yoke $e$. The lower ends of the crank levers rest on another and lower cross-bar $f$ fixed to the casing by side bolts $f^1$ and may have rollers $d^2$ to enable them to move freely on inclines $f^2$ on the said bar $f$. The first cross-bar or yoke $e$ is directly connected at its middle to the valve spindle $b^2$. At each end, by means of an adjustable screw nut $g^1$, it is connected to a tension rod $g$. These rods $g$ transmit the thrust of the balancing springs or like devices $g^2$, to the yoke $e$ and thence to the diaphragm and valve spindle.

The action is as follows: When the pressure in the delivery passage $a^4$ and above the diaphragm, drops below that required, the springs $g^2$ lift the yoke $e$ and spindle $b^2$, thereby opening the valve $b$ and admitting a flow of high pressure steam or fluid from the inlet passage $a^3$ with the object of raising the pressure again. At this time the diaphragm device $c$ will have assumed the upwardly-bulged shape shown in Fig. 3, but when there is the required pressure in the delivery passage $a^4$, this pressure re-acts on the diaphragm device $c$, and overcomes the action of the springs $g^2$, so pulling down and closing the valve $b$ as well as the by-pass valve $b^1$. With regard to the latter, it may be explained that the valve spindle $b^2$ has a slight movement relative to valve $b$ however, so that (in rising) the small valve $b^1$ is opened a little before the main valve $b$, and therefore the steam can pass up through the apertures $b^3$ and past valve $b^1$ into the top cylinder $a^5$, thus counter-balancing or neutralizing any pressure on the under side of valve $b$ and rendering this latter quite easy to move. The valve $b^1$ closes when the main valve $b$ drops again on to its seat. In this way, if any high pressure steam should leak up around the body of valve $b$, into the cylinder $a^5$, it would be stopped at the small valve $b^1$ and so could not pass to the low pressure outlet.

The action of the improved diaphragm which is the main part of the invention, will now be considered. When the spindle $b^2$ is being forced up by the yoke $e$ under the action of the balancing springs $g^2$, the adjacent ends of the lever $d$ are drawn upward and cause the diaphragm rings $c$ to assume a conical or bulged shape, so that the rubber disk $c^4$ is supported without resting on any sharp corners or angles which might cause wear or damage. At the same time the lower ends of the levers, where they rest on the cross-bar $f$, are drawn together and come for instance centrally under the outermost of the rings $c$. Hence the downward thrust due to the pressure on this outside ring, now comes directly and centrally over the rollers $d^2$ and so is supported thereby, instead of being transmitted to the valve spindle $b^2$, and thus the load on the springs $g^2$ is correspondingly reduced. This occurs at the time when the springs have expanded to open the valve and are therefore not exerting so much force. This compensating action has an important bearing on the proper working of the apparatus and prevents premature closing of the valve $b$. If the rollers $d^2$ move farther inward, they take off the pressure of more of the rings, and the inclines $f^2$ facilitate this, as they cause the levers to be raised slightly and so facilitate the keeping of the rings $c$ at the levels necessary to properly support the rubber disk $c^4$. It will be readily understood that the nuts $g^1$ should be equally adjusted, or the yoke $e$ might be twisted and give an uneven action. This may be insured in any convenient way.

I claim:—

1. In a reducing valve, the combination of recessed rings fitting telescopically inside one another; lever supporting said rings; shoulders on said rings engaging the recesses in the adjacent rings, to lock said rings together when in the extreme downward position and prevent them from blowing out in case the supporting levers should break; and a valve spindle to which said levers are coupled, substantially as described.

2. In a reducing valve, the combination of concentric rings fitting telescopically and practically steam-tight inside one another; levers supporting said rings; a valve spindle to which said rings are connected; balancing spring for counteracting the pressure on said rings; and shoulders on said rings to prevent them blowing out in the event of said supporting levers breaking, substantially as described.

3. In a reducing valve, the combination, with the balancing springs, of a diaphragm, compensating crank levers for supporting said diaphragm connected at their upper ends to the valve spindle and to said springs, a cross-bar on which the lower ends of said levers rest, and inclines on said cross-bar for raising the ends of the levers as they move inward toward each other.

In testimony whereof I affix my signature in presence of two witnesses.

CHARLES ROBERT ARCUS.

Witnesses:
C. BARNARD BURDON,
TRACY LAY.